United States Patent
Cho

(10) Patent No.: US 7,430,814 B2
(45) Date of Patent: Oct. 7, 2008

(54) OIL FILLING STRUCTURE OF INTERNAL COMBUSTION ENGINE

(75) Inventor: Masaki Cho, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/826,340

(22) Filed: Jul. 13, 2007

(65) Prior Publication Data
US 2008/0028630 A1 Feb. 7, 2008

(30) Foreign Application Priority Data
Aug. 2, 2006 (JP) ............................. 2006-210954

(51) Int. Cl.
*G01F 23/04* (2006.01)
(52) U.S. Cl. .................... 33/726; 33/722; 33/731
(58) Field of Classification Search ........... 33/722–731; 73/290 B, 290 R
See application file for complete search history.

(56) References Cited

U.S. PATENT DOCUMENTS 4,174,574 A * 11/1979 Kirchweger et al. .......... 33/731
6,926,121 B2 * 8/2005 Gates et al. .................... 33/731
7,159,330 B2 * 1/2007 Takaya et al. .................. 33/726
2006/0070606 A1 * 4/2006 Cho ............................ 123/533

FOREIGN PATENT DOCUMENTS

JP 2003-97241 A 4/2003

* cited by examiner

*Primary Examiner*—Yaritza Guadalupe-McCall
(74) *Attorney, Agent, or Firm*—Birch, Stewart, Kolasch & Birch, LLP

(57) ABSTRACT

In an internal combustion engine, an oil-filler-port/oil-level-gauge attachment hole is formed on a side of the internal combustion engine. An oil-level-gauge for measuring the amount of oil in the inside of the internal combustion engine extends within the oil-filler-port. The oil-level-gauge is formed integral with a cap for the oil-filler-port. A guide cylinder portion for guiding the gauge deep inside the oil-level-gauge attachment hole is provided to extend therein. A side outflow hole where the filled oil detours around the guide cylinder portion and directly flows down to the inside is formed on the way of the guide cylinder portion. A guide wall for preventing the gauge from entering the side outflow hole is formed on a lower portion of the side outflow hole.

20 Claims, 4 Drawing Sheets

OIL FILLING STRUCTURE OF INTERNAL COMBUSTION ENGINE

CROSS-REFERENCE TO RELATED APPLICATIONS

The present application claims priority under 35 USC 119 to Japanese Patent Application No. 2006-210954 filed on Aug. 2, 2006 the entire contents of which are hereby incorporated by reference.

BACKGROUND OF THE INVENTION

1. Field of the Invention

The present invention relates to an oil filling structure of an internal combustion engine including, on a side of the internal combustion engine, an oil-filler-port/oil-level-gauge attachment hole, and an oil-level-gauge integral with a cap of the oil-filler-port.

2. Description of Background Art

Heretofore, an oil-level-gauge has been short, and an oil-level-gauge attachment hole-oil-filler-port has been provided in a lower portion of an internal combustion engine. See, for example, Japanese Patent Application Laid-Open Publication No. 2003-97241. Therefore, a worker must take a low posture for checking the oil level and performing an oil filling operation. In addition, the workability of this arrangement is decreased.

SUMMARY AND OBJECTS OF THE INVENTION

An object of an embodiment of the present invention is to provide an oil filling structure that makes it possible to enhance the workability of filling oil, and to enhance the workability of checking the oil level.

According to an embodiment of the present invention, an oil filling structure of an internal combustion engine includes an oil-filler-port/oil-level-gauge attachment hole on a side of the internal combustion engine with an oil-level-gauge for measuring the amount of oil in the internal combustion engine being mounted thereon. The oil-level-gauge is integral with a cap of the oil-filler-port. In the oil filling structure, a guide cylinder portion that guides the gauge deep inside of the oil-level-gauge attachment hole is provided to extend therein. A side outflow hole where filled oil detours around the guide cylinder portion and directly flows down to the inside is formed on the way of the guide cylinder portion. A guide wall for preventing the gauge from entering the side outflow hole is formed on a lower portion of the side outflow hole.

According to an embodiment of the present invention, the oil filling structure of an internal combustion engine includes an oil-level-gauge attachment hole that is provided on a cover member that covers a rotator in the inside of the internal combustion engine, and the guide cylinder portion is formed to be smaller in diameter than the oil-filler-port.

According to an embodiment of the present invention, the oil filling structure of an internal combustion engine includes a clutch on an end portion of a transmission shaft provided on a rear of a crankshaft in parallel thereto. The oil-level-gauge is provided in an upper portion of a space around a shaft end portion of the crankshaft in front of the clutch.

According to an embodiment of the present invention, a positional shift of the oil-level-gauge can be prevented while enhancing the easiness of filling the oil by providing the side outflow hole. Accordingly, the length of the oil-level-gauge can be longer, and the degree of freedom in position of the oil-filler-port is enhanced. Thus, the oil-filler-port is provided at the optimum position.

According to an embodiment of the present invention, even if the guide cylinder portion is formed to be small in diameter, the efficiency of the oil filling work is enhanced due to a direct oil flow from the side hole. Accordingly, by forming the guide cylinder portion to be small in diameter, the inserting direction of the gauge can be properly controlled. In addition, the cover member is prevented from projecting. Thus, the internal combustion engine can be downsized.

According to an embodiment of the present invention, the oil-level-gauge is placed by utilizing the space around the shaft end portion of the crankshaft in front of the clutch. Accordingly, a high space usability is obtained. Moreover, the oil-filler-port is provided above the crankshaft above an oil level of the oil pan. Accordingly, the efficiency of the oil filling work from a relatively narrow space on the side of the cylinder is also enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
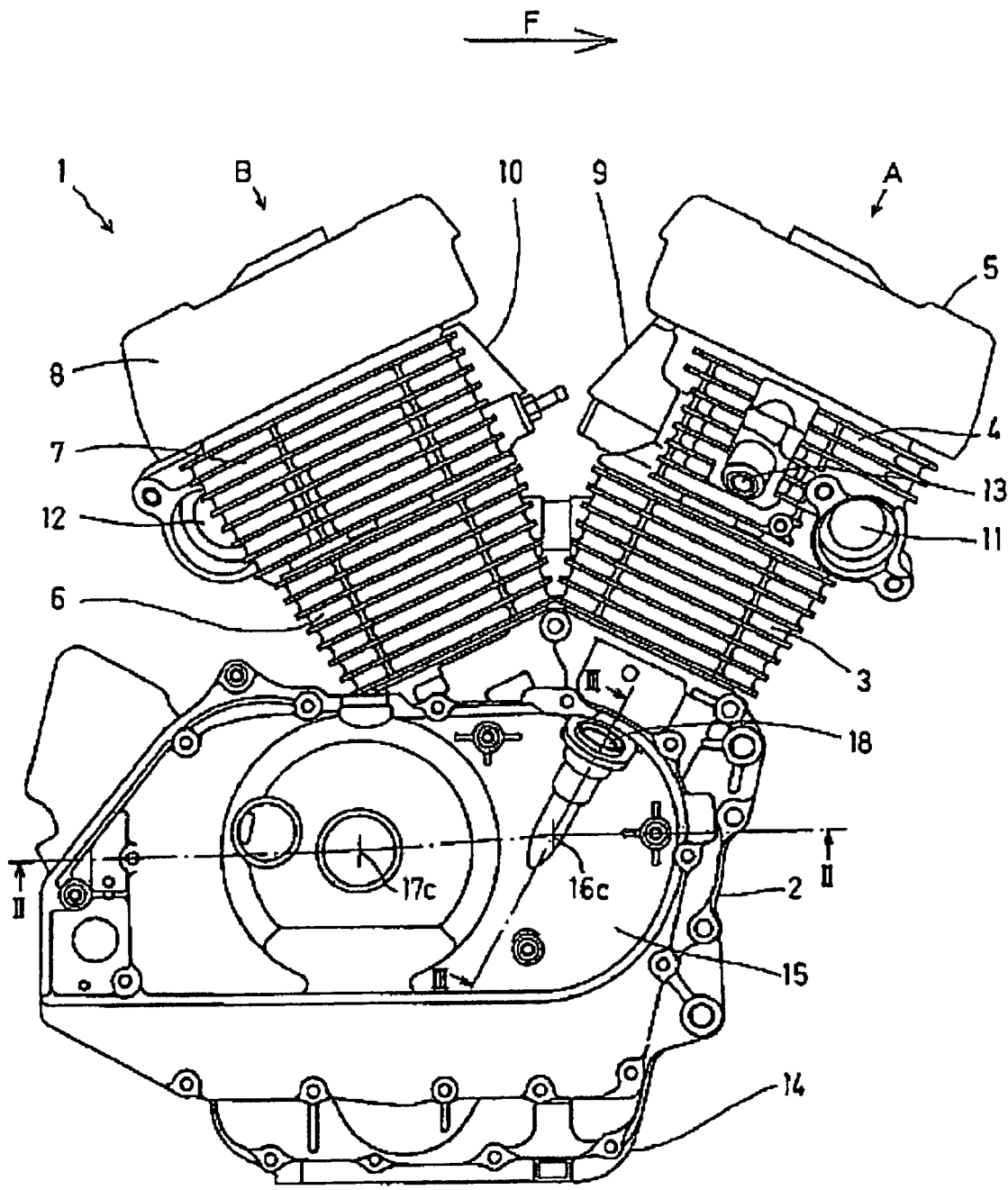
FIG. 1 is a side view of a V-type internal combustion engine 1 to which an oil filling structure of the present invention is applied.

FIG. 1 is a side view of a V-type internal combustion engine 1 to which an oil filling structure of the present invention is applied. An arrow F indicates a forward traveling direction in a state wherein the internal combustion engine 1 is attached to a vehicle. The internal combustion engine is mounted on a motorcycle. A crankcase 2 is assembled onto an upper surface of which a front cylinder A composed of a cylinder block 3, a cylinder head 4, and a head cover 5, and a rear cylinder B composed of a cylinder block 6, a cylinder head 7, and a head cover 8. An inlet port 9 and an exhaust port 11 are provided on the front cylinder A. An inlet port 10 and an exhaust port 12 are provided on the rear cylinder B. A spark plug mounting hole 13 is provided on the front cylinder A. A spark plug of the rear cylinder B is provided on an opposite side surface to the spark plug 13 of the front cylinder A, and accordingly, is not shown.

An oil pan 14 is provided on a lower portion of the crankcase 2. A right crankcase cover 15 covers a rotating portion in a right side of the crankcase. A left crankcase cover is not shown. A center portion of a crankshaft 16c is provided together with a center portion of a main shaft 17c of a constant-mesh transmission. An oil-filler-port/oil-level-gauge attachment hole 18 is provided with details being described hereinafter.

Figure 2:
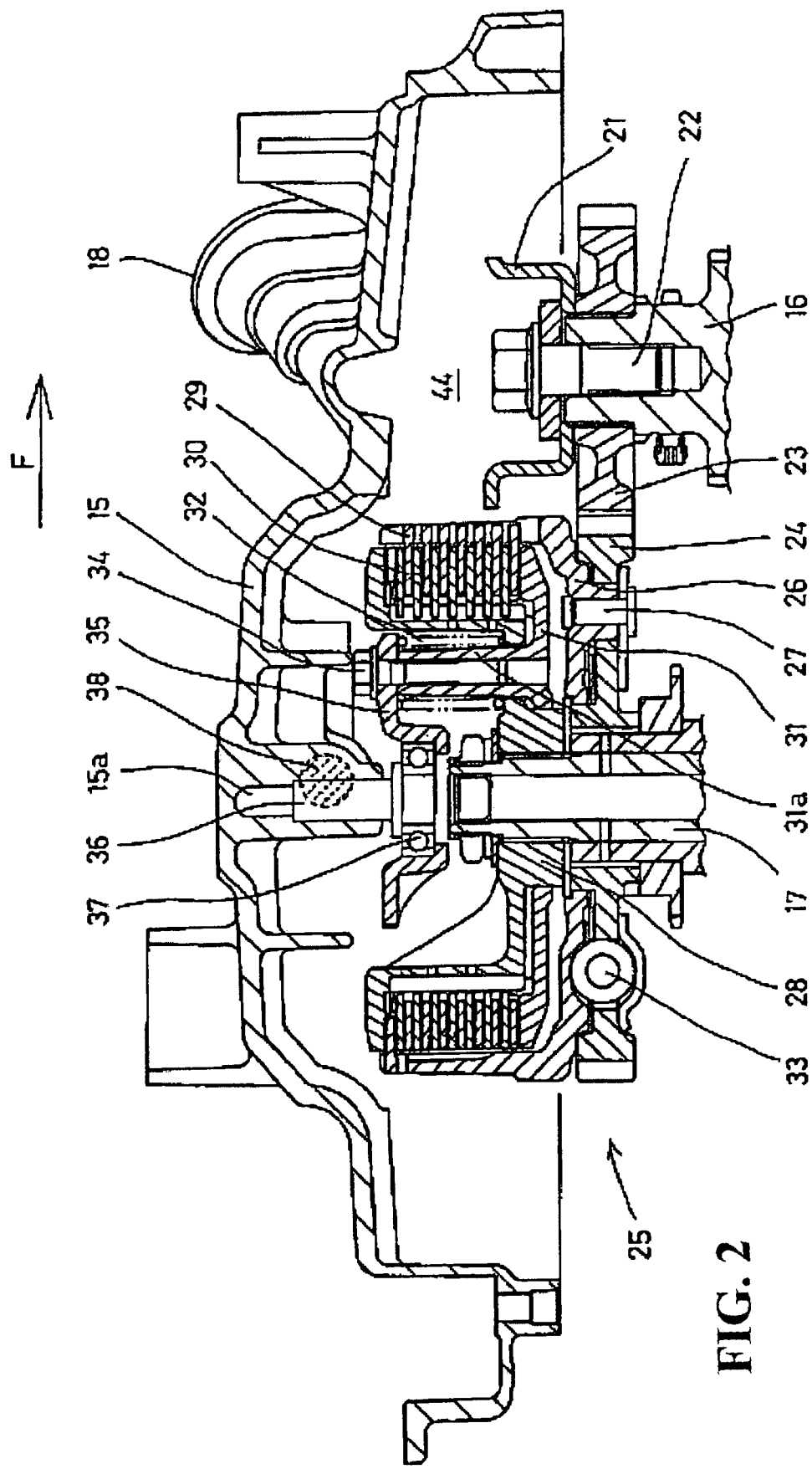
FIG. 2 is a cross-sectional view along a line II-II of FIG. 1.

FIG. 2 is a cross-sectional view along a line II-II of FIG. 1, mainly showing the right crankcase cover 15, the crankshaft 16, a main shaft 17 of the constant-mesh transmission, and devices attached thereto. In the drawing, an arrow F indicates the forward traveling direction of the vehicle. Both of the crankshaft 16 and the main shaft 17 of the transmission are arranged perpendicularly to the traveling direction of the vehicle.

Onto an end surface of the crankshaft 16, a pulsar 21 is fixed by a bolt 22, and the pulsar 21 rotates together with the crankshaft 16. A drive gear 23 is fixed to an end portion of the crankshaft 16. Onto a position on the main shaft 17 of the transmission, which corresponds to the drive gear 23, a driven gear 24 is mounted that constantly meshes with the drive gear 23 and is rotatable in a circumferential direction relatively to the main shaft 17 of the transmission. On an end portion of the main shaft, there is provided a multi-plate clutch 25 which is normally engaged with the main shaft 17, but which is disengaged therefrom when a manipulation mechanism is operated. The clutch 25 is placed on a rotation power transmission path from the crankshaft 16 toward the main shaft 17 of the transmission, and is engaged with and disengaged from the main shaft 17 in response to a gear shift operation by a rider.

In the multi-plate clutch 25, a clutch outer 26 is fixed to the driven gear 24 by rivets 27, and a clutch inner 28 is fixed to the main shaft 17. A plurality of outer friction plates 29 are held on the clutch outer 26 so as to be axially movable, and a plurality of inner friction plates 30 are held on the clutch inner 28 so as to be axially movable. The outer friction plates 29 and the inner friction plates 30 are overlapped in a state of being alternating with each other. A pressure plate 31 is attached to the clutch inner 28. The clutch inner 28 and the pressure plate 31 sandwich the pluralities of friction plates 29 and 30 therebetween with a spring force of a coil spring 32, thereby generating a frictional force. A rotational drive force of the crankshaft 16 propagates from the drive gear 23 to the driven gear 24, and propagates to the main shaft 17 of the transmission through the clutch outer 26, the friction plates 29 and 30, and the clutch inner 28. A shock absorbing device 33 is provided in the driven gear 24.

One end of the coil spring 32 abuts on the clutch inner 28, and the other end thereof abuts on an annular member 35 fixed by a bolt 34 to an end of a projection portion 31a of the pressure plate 31. Into a recessed portion 15a in the inside of the right crankcase cover 15, an operational shaft 36 is mounted so as to be movable in a direction of the main shaft. The annular member 35 is held on the operation shaft 36 while interposing a ball bearing 37 therebetween. The operation mechanism 38 engaged with the operation shaft 36 from an upper portion of the right crankcase cover is provided. Through the operation mechanism 38, the operation shaft 36 is externally driven by the rider. In order to release the engaged state of the clutch, the operation shaft 36 is pushed toward the main shaft through the operation mechanism 38, and the pressure plate 31 is separated from a group of the friction plates 29 and 30 while overcoming the force of the coil spring 32. In this way, the connection between the driven gear 24 and the main shaft 17 is cut.

In FIG. 2, the oil-filler-port/oil-level-gauge attachment hole 18 is provided on the right crankcase cover 15 in the vicinity of the end portion of the crankshaft 16. This attachment hole 18 is formed to project outwardly from an outer surface of the right crankcase cover.

Figure 3:
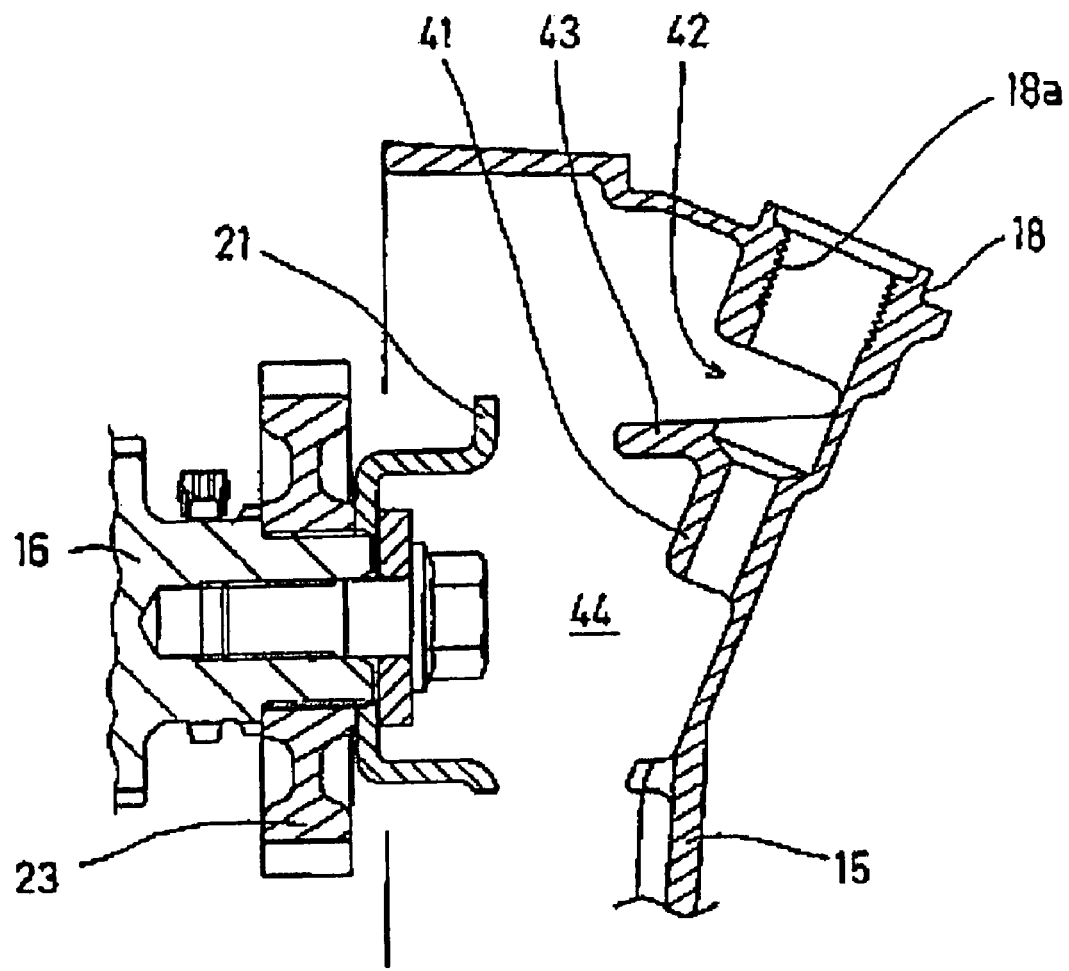
FIG. 3 is a cross-sectional view along a line III-III of FIG. 1.

FIG. 3 is a cross-sectional view along a line III-III of FIG. 1. The oil-filler-port/oil-level-gauge attachment hole 18 is provided to project outwardly from the outer surface of the right crankcase cover 15. An oil-level-gauge 45 (FIG. 4) that is integral with a cap of the oil-filler-port is mounted onto a screw portion 18a at an opening of the attachment hole 18. A guide cylinder portion 41 that guides the gauge deep inside from the oil-level-gauge attachment hole 18 is provided so as to extend therefrom. A side outflow hole 42 is formed on the way of the guide cylinder portion 41 wherein the filled oil directly flows down to the inside without passing through the guide cylinder portion 41 when the oil is filled. On a lower portion of the side outflow hole 42, a guide wall 43 that prevents the oil-level-gauge from entering the side outflow hole 42 is formed. The guide cylinder portion 41 is formed to be smaller in diameter than the oil-filler-port 18. This is for controlling the inserting direction of the oil-level-gauge. The filled oil can directly flow down the inside via the side outflow hole 42 without passing through the guide cylinder portion 41. Accordingly, the smallness of the diameter of the guide cylinder portion 41 does not hinder the oil from being filled. The oil-level-gauge attachment hole 18 is provided in an upper portion of a vacant space 44 (FIG. 2, FIG. 3) around a shaft end portion of the crankshaft 16 in front of the multi-plate clutch 25. Accordingly, the vacant space is effectively utilized in the event of placing the oil-level-gauge 45.

Figure 4:
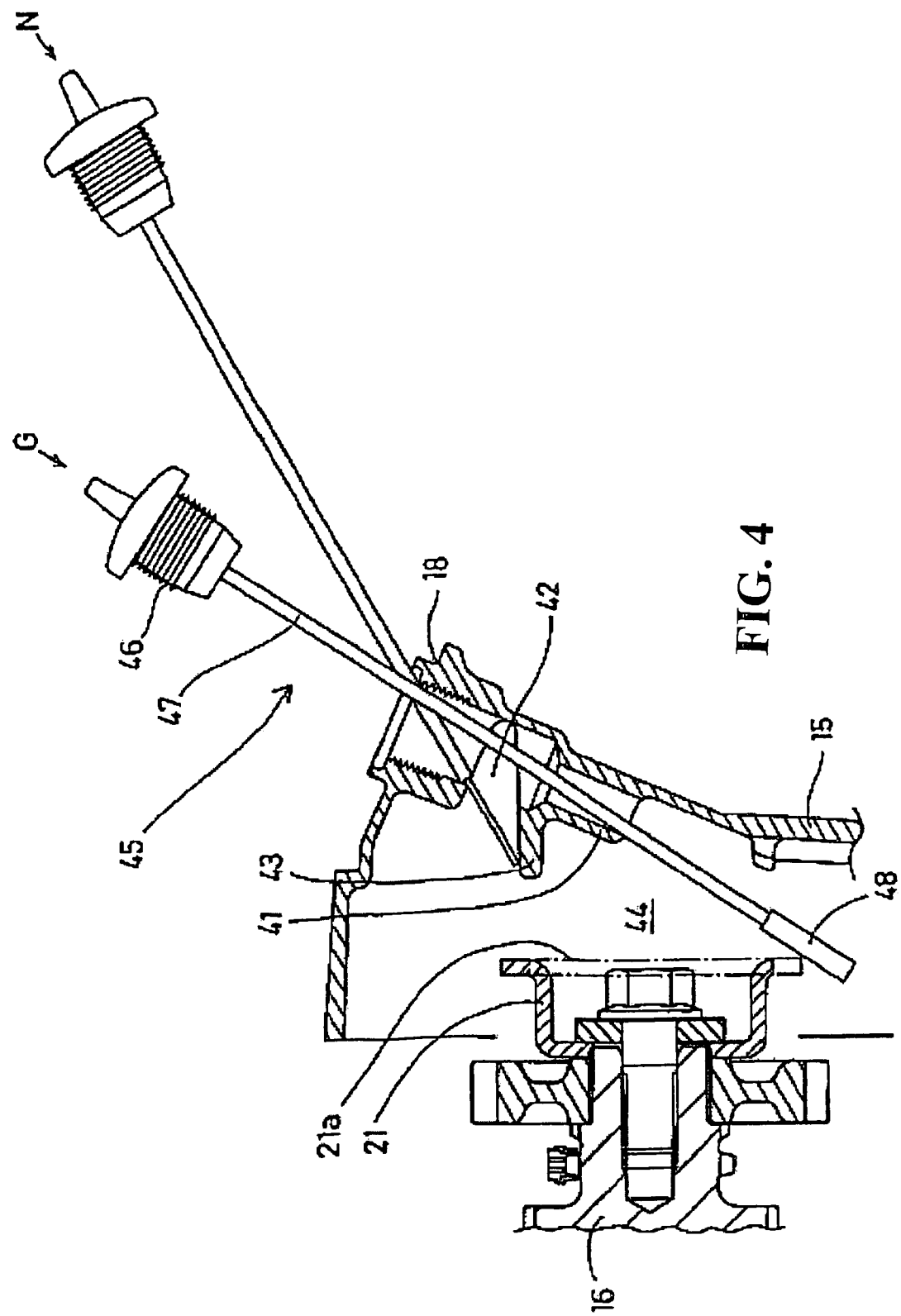
FIG. 4 is an explanatory view of work of checking the oil level.

FIG. 4 is an explanatory view of the oil level check. As for the oil-level-gauge 45, one end of a stick-like portion 47 thereof is connected to a cap 46 of the oil-filler-port, and a gauge portion 48 is formed on the other end of the stick-like portion 47. Usually, the oil-level-gauge 45 is fixed by screwing the cap 46 into the oil-filler-port 18 in a state wherein the stick-like portion 47 and the gauge portion 48 are housed in the right crankcase cover 15. When checking the oil level, the oil-level-gauge 45 is pulled out from the oil-filler-port 18, the oil adhered onto the gauge portion 48 on a tip end of the oil-level-gauge 45 is wiped off. Then, the oil-level-gauge 45 is inserted into the inside from the oil-filler-port 18 again, and by looking at how the gauge portion 48 is wet with the oil, the amount of the filled oil can be determined.

In the case of performing such an oil level checking, it is usually difficult to set the inserting direction of the oil-level-gauge. However, in this embodiment, an oil-level-gauge G of FIG. 4 enters in a substantially normal direction by being guided by the guide cylinder portion 41. Even in the most tilted state, that is, in an illustrated state, the oil-level-gauge G does not touch a rotation track 21a of the pulsar 21. Accordingly, a checking result can be obtained safely. An oil-level-gauge N of FIG. 4 has taken the wrong inserting direction entering from the oil-filler-port 18 slantingly in a direction of the side outflow hole 42. When the oil-level-gauge N enters in such a way, the oil-level-gauge N touches the guide wall 43 formed on the lower portion of the side outflow hole 42, and does not advance forward. Accordingly, a worker finds that the inserting direction was wrong, and can retry to insert the gauge in the right direction.

In the oil filling structure of this embodiment, which has been described above in detail, the following effects are brought about.

A positional shift of the oil-level-gauge can be prevented while enhancing easiness of filling the oil by providing the side outflow hole. Accordingly, the length of the oil-level-gauge can be longer as compared to a conventional oil-level-gauge, and the degree of freedom in the position of the oil-filler-port is enhanced. Thus, the oil-filler-port can be provided at the optimum position.

(2) Even if the guide cylinder portion is formed to be small in diameter, the efficiency of the oil filling work is enhanced due to direct oil flow from the side hole. Accordingly, by forming the guide cylinder portion to be small in diameter, the inserting direction of the gauge can be controlled. In addition, the cover member is prevented from projecting. Thus, the internal combustion engine can be downsized.

(3) The oil-level-gauge is placed utilizing the space around the shaft end portion of the crankshaft in front of the clutch. Accordingly, a high space usability is obtained. Moreover, the oil-filler-port is provided above the crankshaft above the oil level of the oil pan. Accordingly, the efficiency of the oil filling work performed from a relatively narrow space on the side of the cylinder is also enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil filling structure of an internal combustion engine comprising:
    an oil-filler-port/oil-level-gauge attachment hole formed on a side of the internal combustion engine wherein an oil-level-gauge is positioned for measuring the amount of oil in the inside of the internal combustion engine, the oil-level-gauge being integral with a cap for the oil-filler-port;
    a guide cylinder portion for guiding the oil-level-gauge deep inside of the oil-level-gauge attachment hole, said guide cylinder portion extends within the internal combustion engine;
    a side outflow hole for filling oil, said side outflow hole being formed to detour around the guide cylinder portion for oil to directly flow down to the inside on the way of the guide cylinder portion; and
    a guide wall for preventing the oil-level-gauge from entering the side outflow hole, said guide wall being formed on a lower portion of the side outflow hole.

2. The oil filling structure of an internal combustion engine according to claim 1, wherein:
    the oil-level-gauge attachment hole is provided on a cover member for covering a rotator in the inside of the internal combustion engine; and
    the guide cylinder portion is formed to be small in diameter relative to the oil-filler-port.

3. The oil filling structure of an internal combustion engine according to claim 2, wherein
    the internal combustion engine includes a clutch on an end portion of a transmission shaft provided on rear of a crankshaft in parallel thereto, and
    the oil-level-gauge is provided in an upper portion of a space around a shaft end portion of the crankshaft in front of the clutch.

4. The oil filling structure of an internal combustion engine according to claim 1, wherein the guide cylinder portion extends directly along a side wall of a cover member and the guide wall projects inwardly from the guide cylinder portion.

5. The oil filling structure of an internal combustion engine according to claim 1, wherein the side outflow hole is disposed directly adjacent to the oil-filler-port for diverting oil directly into the internal combustion engine.

6. The oil filling structure of an internal combustion engine according to claim 5, wherein the guide wall is formed adjacent a lower portion of the side outflow hole.

7. The oil filling structure of an internal combustion engine according to claim 1, wherein providing a guide cylinder portion for guiding the oil-level-gauge enables a length of the oil-level-gauge to be extended.

8. The oil filling structure of an internal combustion engine according to claim 1, wherein the guide cylinder portion is smaller in diameter relative to the side outflow hole for enabling oil that is supplied into the oil-filler-port to be readily diverted to the side outflow hole during filling.

9. The oil filling structure of an internal combustion engine according to claim 8, wherein the guide cylinder portion extends directly downwardly for accommodating the oil-level-gauge and the side outflow hole extends directly inwardly for enabling oil to flow directly into the internal combustion engine.

10. The oil filling structure of an internal combustion engine according to claim 1, wherein the oil-filler-port is disposed above a crankshaft of the engine and above an oil level of an oil pan.

11. An oil filling structure for use with an internal combustion engine comprising:
    an oil-filler-port/oil-level-gauge attachment hole for receiving an oil-level-gauge for measuring the amount of oil within an internal combustion engine;
    a guide portion for guiding the oil-level-gauge within the oil-level-gauge attachment hole;
    a side outflow hole for filling oil, said side outflow hole being formed to detour around the guide portion for enabling oil to directly flow within an internal combustion engine; and
    a guide wall for preventing the oil-level-gauge from entering the side outflow hole, said guide wall being formed on a lower portion of the side outflow hole.

12. The oil filling structure for use with an internal combustion engine according to claim 11, wherein:
    the oil-level-gauge attachment hole is provided on a cover member for covering a rotator in the inside of an internal combustion engine; and
    the guide portion is formed to be smaller in diameter relative to the oil-filler-port.

13. The oil filling structure for use with an internal combustion engine according to claim 12, wherein
    an internal combustion engine includes a clutch on an end portion of a transmission shaft provided on rear of a crankshaft in parallel thereto, and
    the oil-level-gauge is provided in an upper portion of a space around a shaft end portion of the crankshaft in front of the clutch.

14. The oil filling structure for use with an internal combustion engine according to claim 11, wherein the guide portion extends directly along a side wall of a cover member and the guide wall projects inwardly from the guide portion.

15. The oil filling structure for use with an internal combustion engine according to claim 11, wherein the side outflow hole is disposed directly adjacent to the oil-filler-port for diverting oil directly into an internal combustion engine.

16. The oil filling structure for use with an internal combustion engine according to claim 15, wherein the guide wall is formed adjacent a lower portion of the side outflow hole.

17. The oil filling structure for use with an internal combustion engine according to claim 11, wherein providing a guide portion for guiding the oil-level-gauge enables a length of the oil-level-gauge to be extended.

18. The oil filling structure for use with an internal combustion engine according to claim 11, wherein the guide portion is smaller in diameter relative to the side outflow hole for enabling oil that is supplied into the oil-filler-port to be readily diverted to the side outflow hole during filling.

19. The oil filling structure for use with an internal combustion engine according to claim 18, wherein the guide portion extends directly downwardly for accommodating the oil-level-gauge and the side outflow hole extends directly inwardly for enabling oil to flow directly into the internal combustion engine.

20. The oil filling structure for use with an internal combustion engine according to claim 11, wherein the oil-filler-port is disposed above a crankshaft of the engine and above an oil level of an oil pan.

* * * * *